(12) United States Patent
Yamazaki et al.

(10) Patent No.: US 9,817,236 B2
(45) Date of Patent: Nov. 14, 2017

(54) CONTROLLER AND IMAGE DISPLAY SYSTEM HAVING MULTIPLE ATTACHMENT MEMBERS

(71) Applicant: SEIKO EPSON CORPORATION, Tokyo (JP)

(72) Inventors: Yoko Yamazaki, Matsumoto (JP); Takeshi Fujishiro, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 14 days.

(21) Appl. No.: 14/941,075

(22) Filed: Nov. 13, 2015

(65) Prior Publication Data

US 2016/0147072 A1    May 26, 2016

(30) Foreign Application Priority Data

Nov. 21, 2014  (JP) ................................. 2014-236703

(51) Int. Cl.
  *G02B 27/01*    (2006.01)
  *G06F 1/16*     (2006.01)
(52) U.S. Cl.
  CPC ......... *G02B 27/0176* (2013.01); *G06F 1/163* (2013.01)
(58) Field of Classification Search
  None
  See application file for complete search history.

(56) References Cited

U.S. PATENT DOCUMENTS

| | | | | |
|---|---|---|---|---|
| 5,003,300 A | * | 3/1991 | Wells | G02B 13/16 340/980 |
| 6,762,885 B1 | * | 7/2004 | Ogasawara | G02B 27/0176 345/8 |
| 2006/0221266 A1 | * | 10/2006 | Kato | G02B 27/017 348/838 |
| 2009/0165262 A1 | * | 7/2009 | Shimamura | A45F 5/00 24/163 R |
| 2010/0246022 A1 | * | 9/2010 | Matsumoto | G02B 27/0176 359/630 |
| 2012/0188149 A1 | * | 7/2012 | Yamada | G02B 27/0176 345/8 |
| 2012/0293935 A1 | * | 11/2012 | Sherlock | G06F 1/163 361/679.03 |
| 2014/0168266 A1 | * | 6/2014 | Kimura | G02B 27/0172 345/633 |

FOREIGN PATENT DOCUMENTS

JP           2014-165893 A      9/2014

* cited by examiner

*Primary Examiner* — David D Davis
(74) *Attorney, Agent, or Firm* — Oliff PLC

(57) ABSTRACT

A controller for outputting an operation signal to a virtual image display device includes: a controller main body which outputs the operation signal; a first attachment member attached to the controller main body; and a second attachment member which is attached to a mounting site where the controller is mounted, and to which the first attachment member is removably attached. Thus, it is possible to mount the controller on the mounting site by attaching the first attachment member attached to the controller main body, to the second attachment member attached to the mounting site.

8 Claims, 15 Drawing Sheets

CONTROLLER AND IMAGE DISPLAY SYSTEM HAVING MULTIPLE ATTACHMENT MEMBERS

BACKGROUND

1. Technical Field

The present invention relates to a controller and an image display system.

2. Related Art

According to the related art, a head-mounted display device called HMD which is mounted on a user's head is known (see, for example, JP-A-2014-165893).

The head-mounted display device disclosed in JP-A-2014-165893 includes an image display unit in the shape of a pair of eyeglasses which allows the user to visually recognize a virtual image in the state where the device is mounted on the user's head, and a control unit which controls the operation of the image display unit. Of these, the control unit includes a plurality of keys (power key, direction keys, decision, enter key and the like) for accepting operations by the user. The control unit executes processing corresponding to the input operations (press operations) of these keys, and also executes predetermined image processing on image data corresponding to an image signal acquired from an external device and drives the display unit according to the image data.

When the user uses the head-mounted display device disclosed in JP-A-2014-165893, the control unit is often housed in a pocket or the like of the clothes worn by the user. In such cases, a problem that arises is that it is hard to hold the control unit stably.

SUMMARY

An advantage of some aspects of the invention is to provide a controller and an image display system whose wearability can be improved.

A controller for outputting an operation signal to an electronic device according to a first aspect of the invention includes: a controller main body which outputs the operation signal; a first attachment member attached to the controller main body; and a second attachment member which is attached to a mounting site where the controller is mounted, and to which the first attachment member is removably attached.

According to the first aspect, as the first attachment member attached to the controller main body is attached to the second attachment member attached to a mounting site such as a helmet or the user's arm or waist, for example, the controller can be easily mounted to the mounting site. Therefore, the wearability of the controller can be improved.

In the first aspect, it is preferable that the first attachment member includes a hook and that the second attachment member includes an insertion hole in which the hook is inserted.

According to the first aspect with this configuration, the first attachment member can be attached to the second attachment member with a simple operation of inserting the hook of the first attachment member in the insertion hole of the second attachment member. Therefore, the controller can be easily mounted on the mounting site. Also, if the hook is hung on the mounting site (for example, a pocket of the clothes or the waist part of the bottoms) or on amounting band attached to the mounting site, the controller main body with the first attachment member attached thereto can be mounted on the mounting site without using the second attachment member.

In the first aspect, it is preferable that a dimension in a direction of width of the hook and an inner diameter dimension in the direction of width of the insertion hole are substantially the same.

According to the first aspect with this configuration, since the movement of the hook inserted in the insertion hole in the direction of width is regulated, the unsteadiness of the first attachment member attached to the second attachment member can be restrained. Therefore, the wearability of the controller can be improved further.

In the first aspect, it is preferable that the hook includes a hook-like fastening part which fastens the first attachment member to the second attachment member when inserted in the insertion hole.

According to the first aspect with this configuration, since the fastening part of the hook inserted in the insertion hole fastens the first attachment member to the second attachment member, the coming off of the hook from the insertion hole can be regulated. Therefore, the first attachment member can be attached securely to the second attachment member, thus further improving the wearability of the controller.

In the first aspect, it is preferable that the second attachment member includes a passage hole through which a mounting band attached to the mounting site is inserted and passed.

The mounting band can be a band or belt, for example.

According to the first aspect with this configuration, as the mounting band attached to the mounting site is inserted and passed through the passage hole, the second attachment member can be attached to the mounting site. Also, if the mounting band is on the mounting site such as a helmet or the user's arm or waist, the controller main body can be mounted via the second attachment member and the first attachment member. Therefore, the controller can be mounted securely and easily on a mounting site desired by the user.

In the first aspect, it is preferable that the controller includes a cable extending from the controller main body, and that the first attachment member includes: an attachment part attached to the controller main body; and a first attachment member-side regulating part which extends outward from the attachment part when viewed along a counter direction facing the controller and which regulates a movement of the cable situated outside the controller main body.

According to the first aspect with this configuration, the movement of the cable arranged by being wound on the outer circumference of the controller main body, or the like, can be regulated by the first attachment member-side regulating part. Therefore, since the cable can be housed by being wound along the outer circumference of the controller main body, or the like, obstruction by the cable in the use of the controller can be restrained.

In the first aspect, it is preferable that the controller includes a cable extending from the controller main body, and that the second attachment member forms a space where the cable can be arranged, between the second attachment member and the first attachment member, and includes a second attachment member-side regulating part which regulates a movement of the cable arranged in the space.

According to the first aspect with this configuration, the movement of the cable arranged between the first attachment member and the second attachment member can be regulated by the second attachment member-side regulating part. Therefore, the cable can be housed by being wound between the first attachment member and the second attachment member, or the like, and obstruction by the cable in the use of the controller can be restrained.

In the first aspect, it is preferable that the second attachment member includes a curved surface along the mounting site, on a side opposite to a side facing the first attachment member.

Here, as the mounting site, a helmet or the user's arm or waist or the like may be considered and these sites are curved.

To cope with this, the curved surface of the second attachment member is arranged facing the mounting site. Thus, the second attachment member can be attached in a stable state on the mounting site and the wearability of the controller can be improved further.

An image display system according to a second aspect of the invention includes: an image display device mounted at a position corresponding to a user's head; and the above controller which outputs an operation signal to the image display device.

As the site on the head where the image display device is mounted, an upper part of the head including the forehead, the temporal region, the occipital region and the parietal region can be employed as examples. In this case, if the user wears a helmet, hat or the like, a position corresponding to the upper part, on the helmet, hat or the like, can be employed. That is, as long as the image display device is arranged at a position corresponding to the user's head, the image display device may be directly mounted on the head, or a structure such as a helmet or hat may be present between the head and the image display device.

According to the second aspect, similar effects to the controller according to the first aspect can be achieved.

Moreover, for example, if the image display device and the controller are connected to each other via the cable and the regulating part (first attachment member-side regulating part or second attachment member-side regulating part) which regulates the movement of the cable arranged by being wound on the controller, or the like, is provided on the controller, the cable can be housed by being wound on the controller, or the like. Therefore, the length of the cable can be adjusted in the use of the image display system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Configuration of Image Display System

Figure 1:
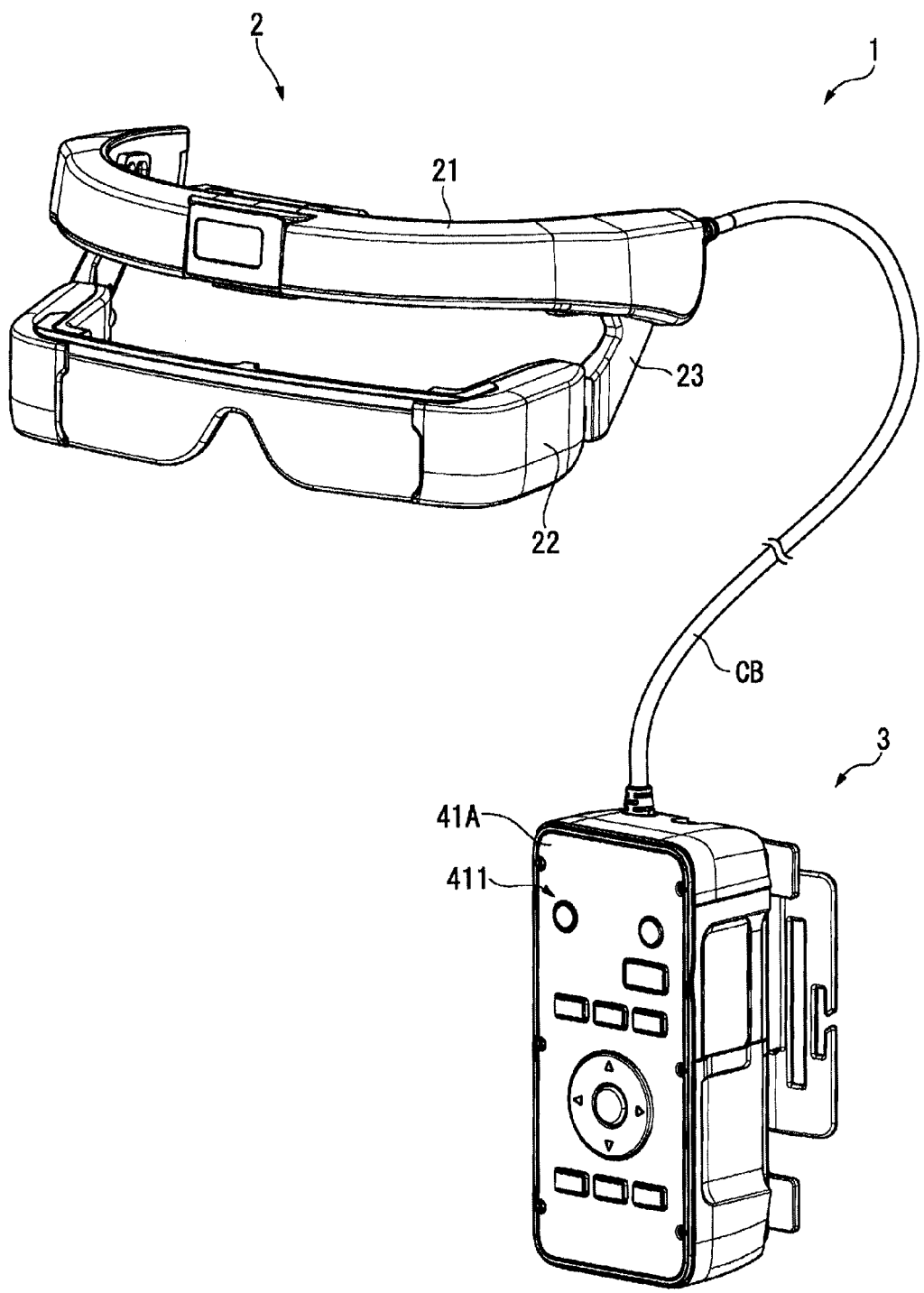
FIG. 1 shows an image display system according to an embodiment of the invention.

FIG. 1 shows the configuration of an image display system 1 according to the embodiment.

The image display system 1 according to the embodiment includes a virtual image display device 2 and a controller 3. In the image display system 1, the virtual image display device 2 operates according to an operation signal and image information transmitted from the controller 3, thus allowing a user wearing the virtual image display device 2 to visually recognize a virtual image corresponding to the image information.

The configuration of each part will be described below.

Configuration of Virtual Image Display Device

The virtual image display device 2 is equivalent to the image display device as an electronic device according to the invention. The virtual image display device 2 is configured as an HMD (head-mounted display) mounted on the user's head, helmet or the like and used in this state. The virtual image display device 2 causes image light corresponding to image information transmitted from the controller 3 via a cable CB (light forming an image corresponding to the image information) to become incident on the user's eyes and thus allows the user to visually recognize an image formed by the image light, as a virtual image. The virtual image display device 2 is also configured to transmit external light so that an image of the outside world can be observed. That is, the virtual image display device 2 is configured as a see-through HMD.

The virtual image display device 2, thus configured, includes a head band part 21 which is mounted on the user's head or at a position on a helmet or the like corresponding to the head (specifically, a top part of the head), a display part 22 which allows the user to visually recognize the image as a virtual image, and an arm part 23 connecting the head band part 21 and the display part 22 to each other.

Configuration of Controller

Figure 2:
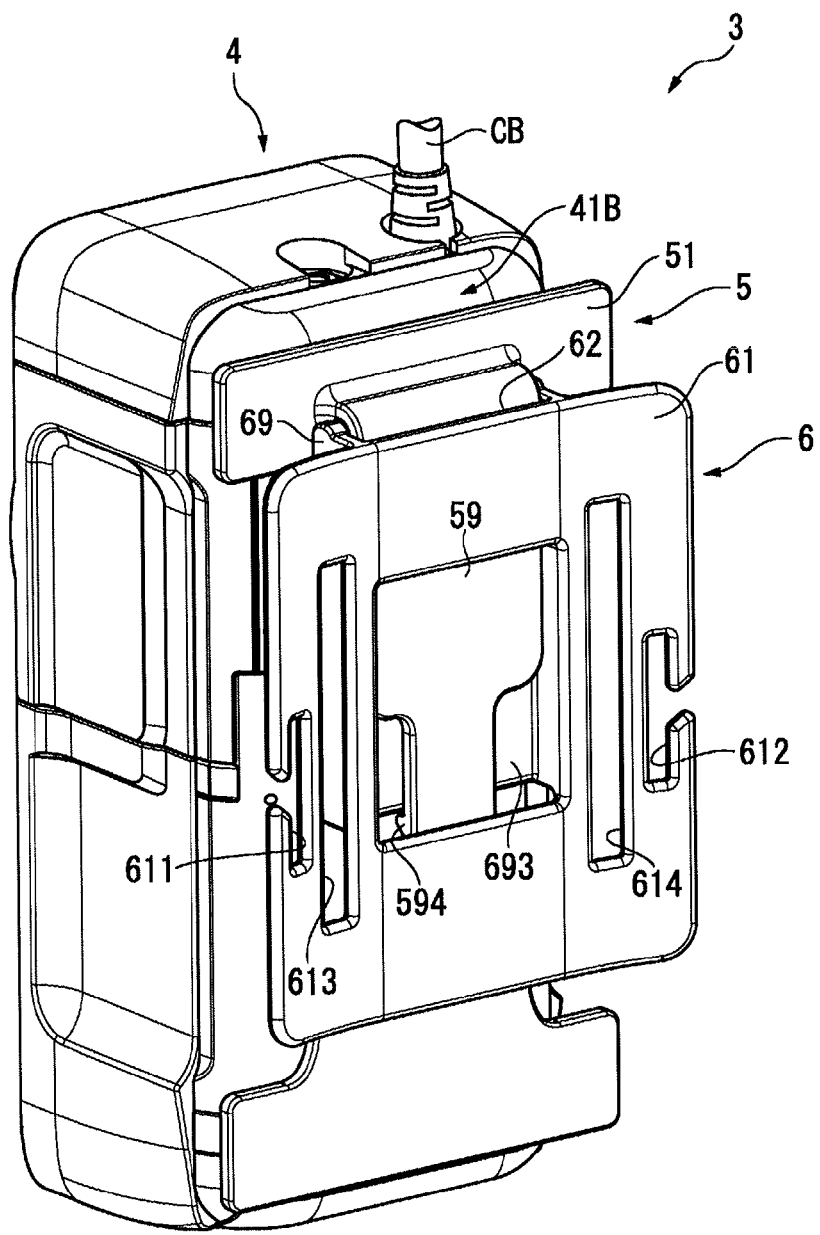
FIG. 2 is a perspective view showing a controller in the embodiment.
Figure 3:
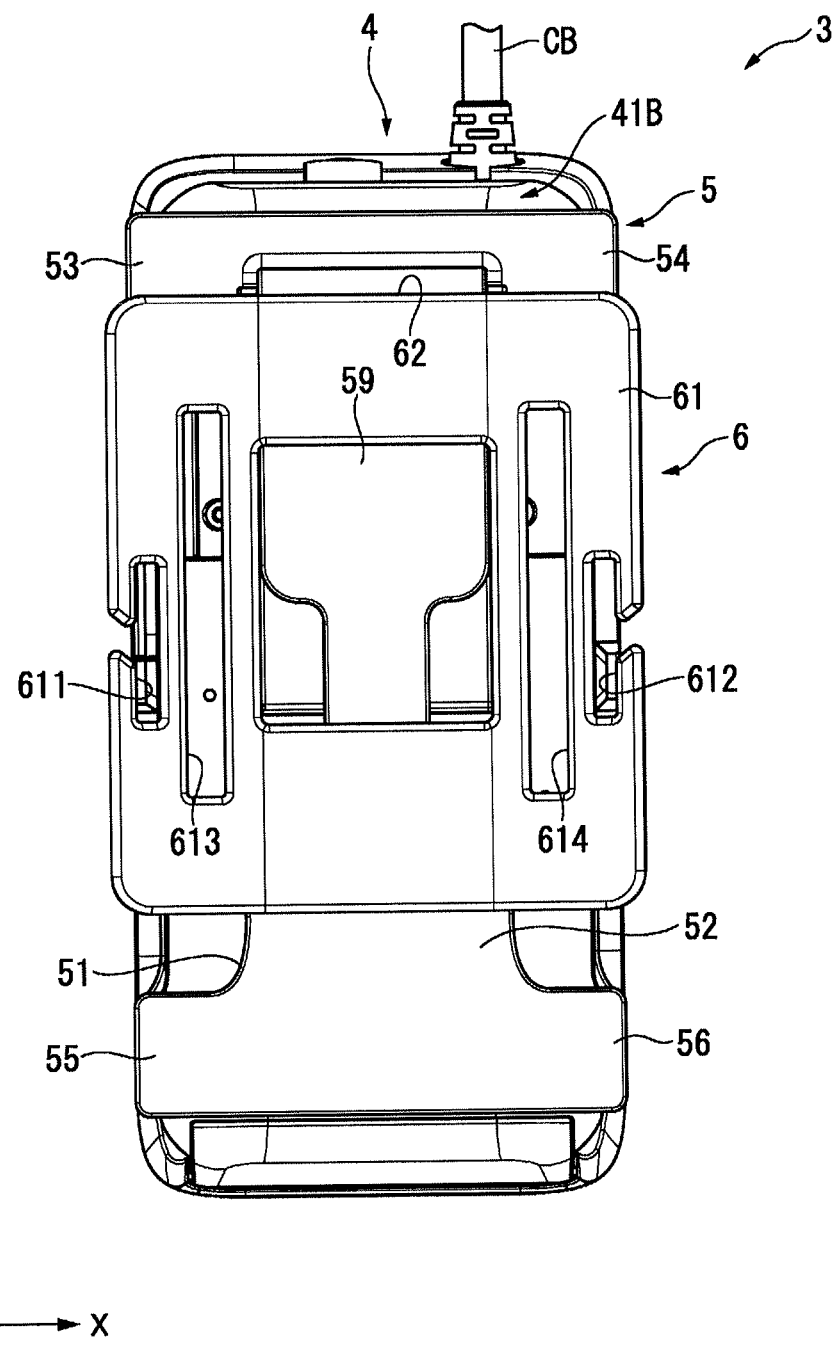
FIG. 3 is a rear view showing the controller in the embodiment.
Figure 4:
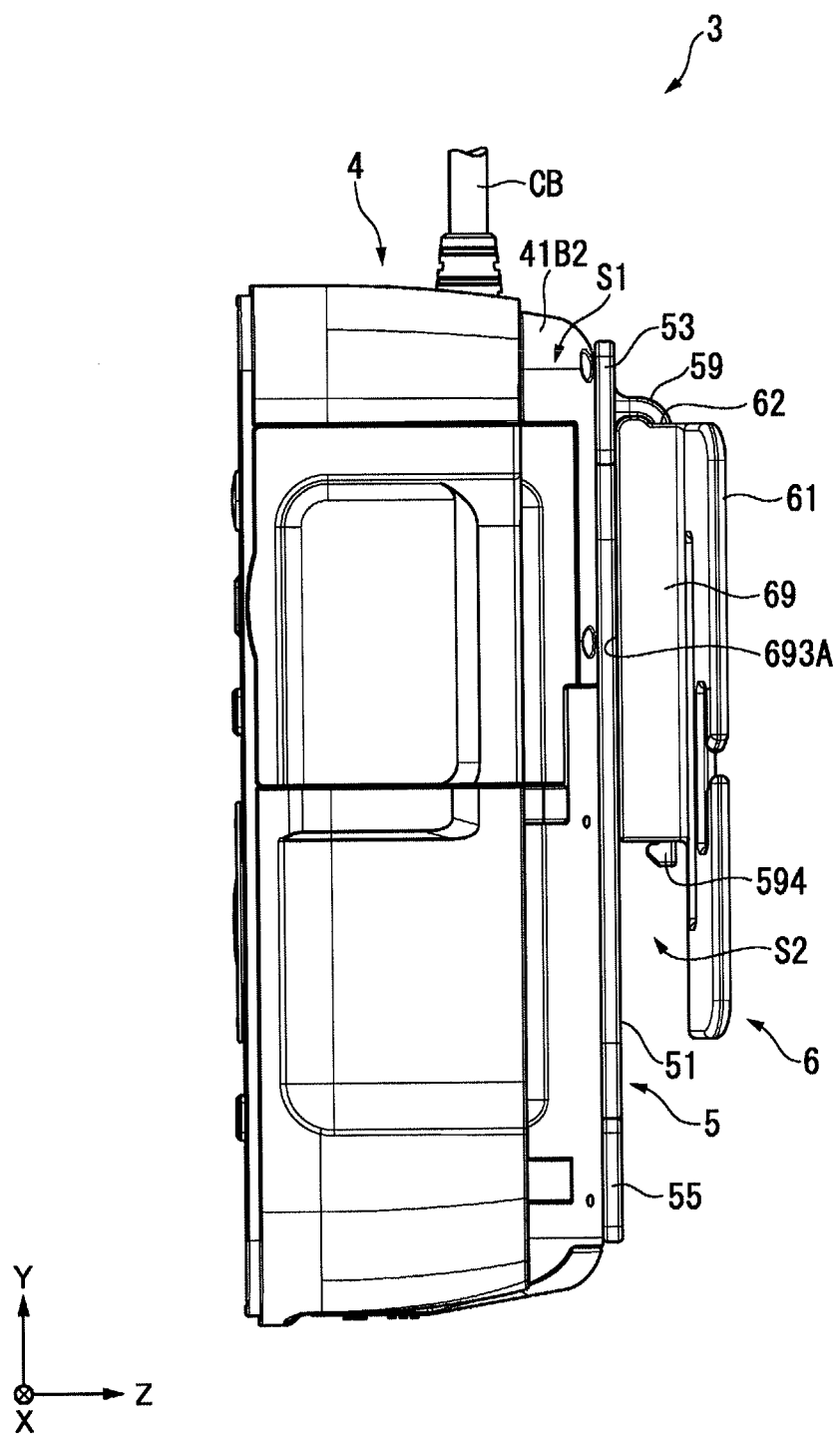
FIG. 4 is a side view showing the controller in the embodiment.
Figure 5:
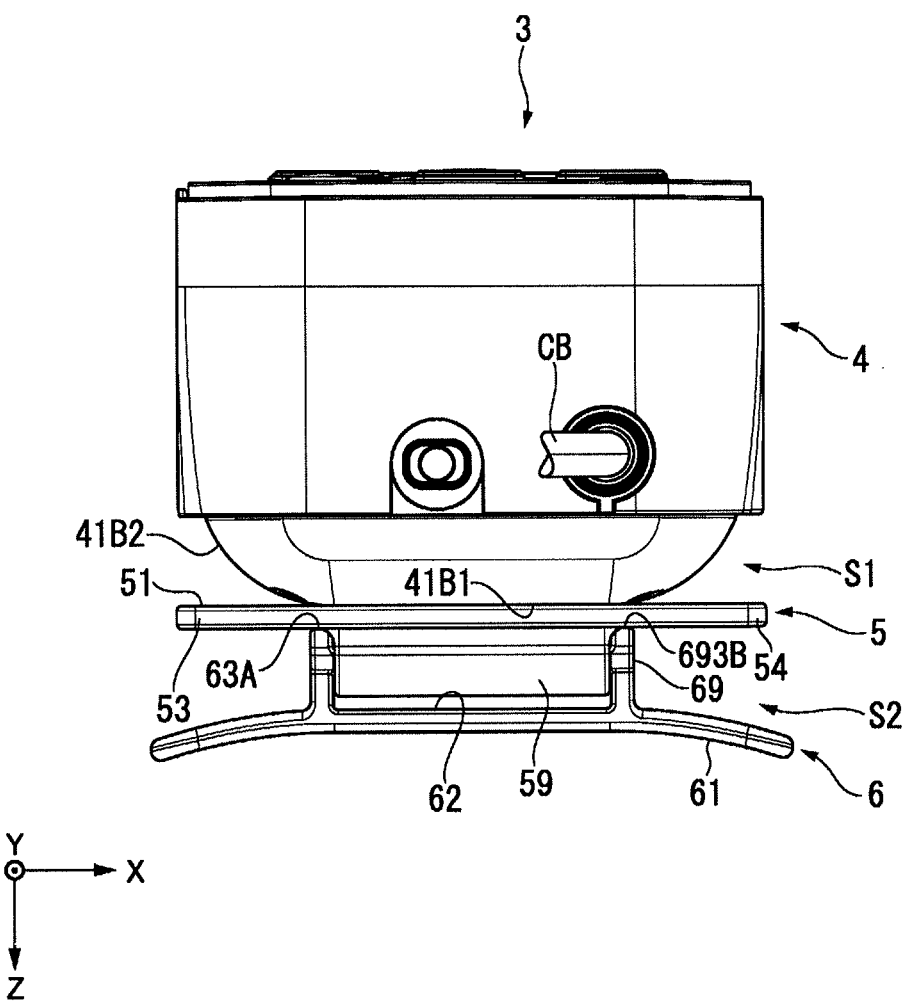
FIG. 5 is a top view showing the controller in the embodiment.
Figure 6:
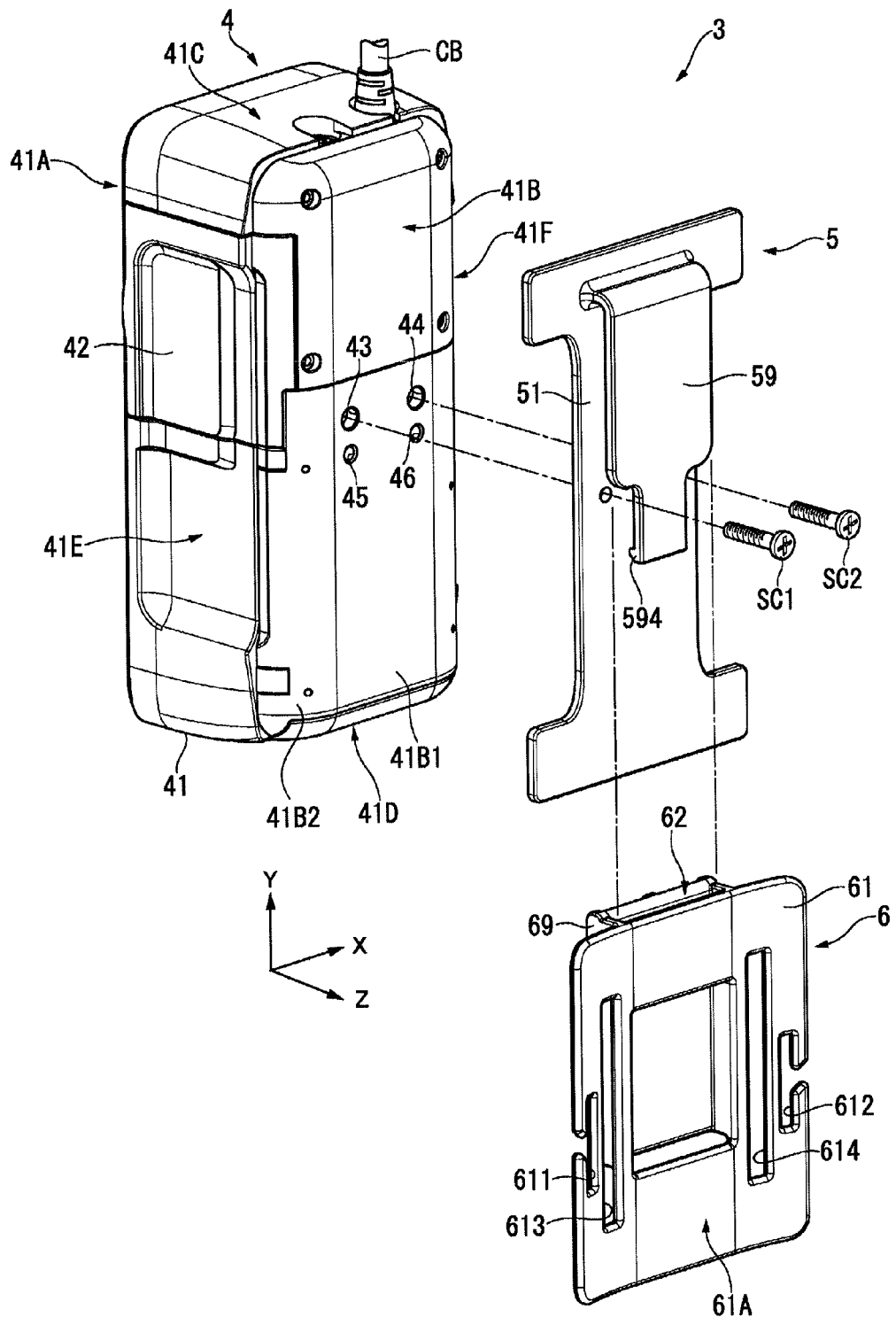
FIG. 6 is an exploded perspective view showing the controller in the embodiment.

FIG. 2 is a perspective view of the controller 3, as viewed from the rear side. FIGS. 3, 4 and 5 are rear, side and top views showing the controller 3. FIG. 6 is an exploded perspective view of the controller 3, as viewed from the rear side.

The controller 3 includes a controller main body 4 which controls the operation of the virtual image display device 2, a first attachment member 5 attached to the controller main body 4, and a second attachment member 6, as shown in FIGS. 2 to 6. Of these, the second attachment member 6 is attached to a mounting site such as a helmet or the user's arm or waist by allowing a mounting band (belt, band or the like) attached to the mounting site to be inserted and passed through the second attachment member 6, as described in detail below. The first attachment member 5 is removably attached to the second attachment member 6. Thus, the controller 3 is mounted on the mounting site.

Configuration of Controller Main Body

The controller main body 4 includes a cable CB and is connected to the virtual image display device 2 via the cable CB. The controller main body 4 includes a casing 41 substantially in the shape of a rectangular parallelepiped, as shown in FIG. 6. A plurality of operation buttons 411 (see FIG. 1) is provided on a front surface 41A of the casing 41. The cable CB extends from a top surface 41C.

In the description below, the direction from the front surface 41A of the casing 41 toward a rear surface 41B which is the surface on the side opposite to the front surface 41A is referred to as a Z-direction, and the directions orthogonal to the Z-direction and orthogonal to each other are referred to as an X-direction and Y-direction. Of these, the Y-direction is described in the embodiment as a direction along the longitudinal direction of the casing 41.

The top surface 41C, a bottom surface 41D and two lateral surfaces 41E, 41F of the casing 41 are covered with an elastic member such as rubber. Thus, when an impact is applied to the controller main body 4, this impact can be relaxed.

Inside the casing 41, though not shown, a control device which controls the operation of the virtual image display device 2, a secondary battery such as a lithium ion battery which stores power to be supplied to the virtual image display device 2, and the like are provided as built-in components.

The control device transmits an operation signal and image information corresponding to an input operation on the operation buttons 411, to the virtual image display device 2 via the cable CB, and controls the operation of the virtual image display device 2. The control device also supplies the power stored in the secondary battery to the virtual image display device 2 via the cable CB.

The controller main body 4 also includes a connection terminal which is connected to the control device and connectable to an external device, on the lateral surface 41E on the side opposite to the X-direction, though not shown. The connection terminal is covered by a terminal cover 42 attached to the lateral surface 41E. The terminal cover 42 is made of an elastic member such as rubber and tightly contacts the surface where the connection terminal is arranged. Thus, when the connection terminal is not connected to an external device, the connection terminal can be prevented from getting wet with water or the like.

The rear surface 41B of the casing 41 includes a flat surface 41B1 and a curved surface 41B2 which is formed continuously to the flat surface 41B1 and is curved in a direction opposite to the Z-direction as it heads outward from the flat surface 41B1.

In a substantially central area on the flat surface 41B1, screw holes 43, 44 for attaching the first attachment member 5 are formed next to each other in the X-direction. On the side opposite to the Y-direction from the screw holes 43, 44, holes 45, 46 for positioning the first attachment member 5 are formed next to each other in the X-direction.

The curved surface 41B2 is curved, specifically, in such a way that the tilt to the XY plane gradually increases as it head outward from the flat surface 41B1. That is, the peripheral edge of the curved surface 41B2 on the side opposite to the flat surface 41B1 is situated on the side opposite to the Z-direction from the flat surface 41B1.

Configuration of First Attachment Member

Figure 7:
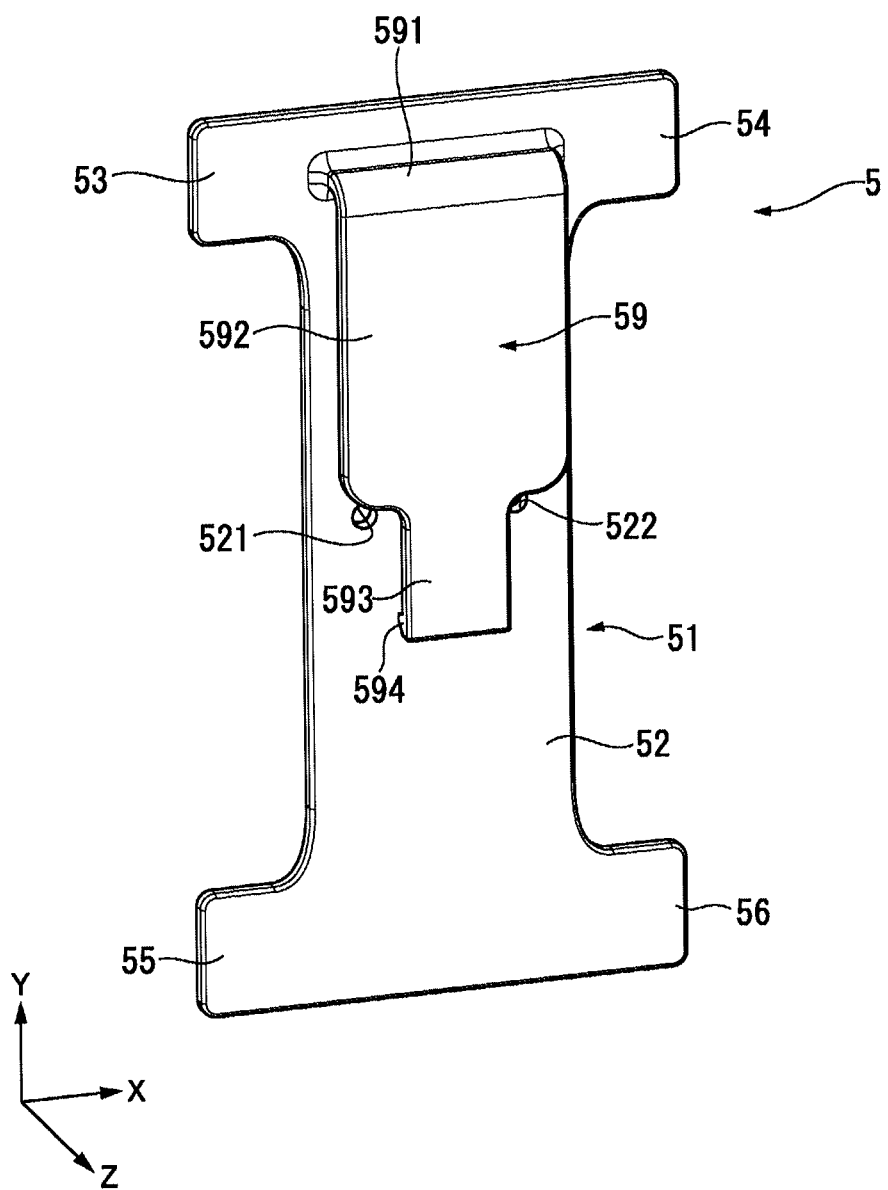
FIG. 7 shows a first attachment member in the embodiment.
Figure 8:
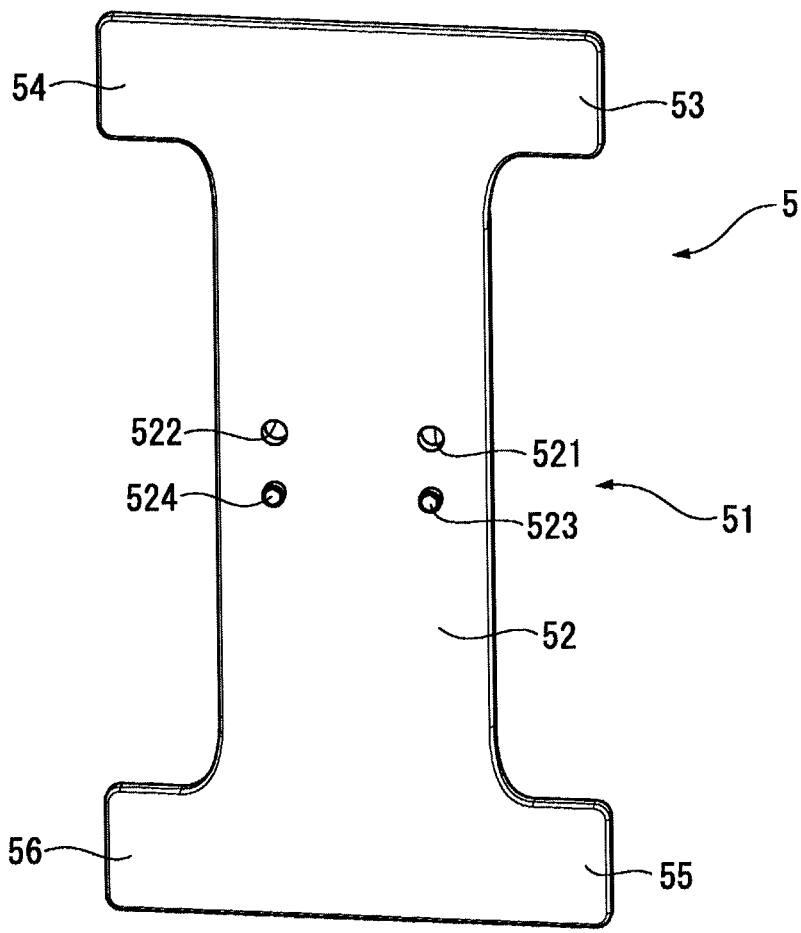
FIG. 8 shows the first attachment member in the embodiment, as viewed from the opposite side of FIG. 7.

FIG. 7 is a perspective view showing the first attachment member 5, as viewed from the side opposite to the Z-direction. FIG. 8 is a perspective view showing the first attachment member 5, as viewed from the Z-direction side.

The first attachment member 5 is attached to the rear surface 41B of the controller main body 4 with screws SC1, SC2 shown in FIG. 6 fitting with the screw holes 43, 44 via the treads thereof. The first attachment member 5 includes a configuration in which the main body part 51 formed in the shape of a plate and a hook 59 to be inserted in an insertion hole 62, described later, in the second attachment member 6, are formed in a unified manner, as shown in FIGS. 7 and 8.

The main body part 51 is arranged at a position facing the rear surface 41B of the controller main body 4 and fixed to the rear surface 41B with the screws SC1, SC2. The main body part 51 is formed into a substantially I-shape and includes a substantially rectangular center part 52 (forming the attachment part according to the invention), and extension parts 53 to 56 extending from both ends in the Y-direction of the center part 52 into the X-direction and the direction opposite to the X-direction. Here, the extension parts 53 to 56 function as regulating parts which regulate the movement of the cable CB, as described below. That is, the extension parts 53 to 56 form the first attachment member-side regulating part according to the invention.

The center part 52 includes two holes 521, 522 in which the screws SC1, SC2 are inserted and passed, substantially at the center in the Y-direction. The holes 521, 522 are situated next to each other in the X-direction.

The center part 52 also includes protruding parts 523, 524 for positioning which protrude on the side opposite to the Z-direction, at positions on the side opposite to the Y-direction from the holes 521, 522. The protruding parts 523, 524, too, are situated next to each other in the X-direction. As the protruding parts 523, 524 are inserted in the holes 45, 46 formed in the rear surface 41B, the first attachment member 5 can be positioned to the controller main body 4. In this state, the first attachment member 5 can be easily attached to the controller main body 4, using the screws SC1, SC2.

As shown in FIG. 3, both ends in the X-direction of the center part 52 are situated on the inner side of both ends in the X-direction of the controller main body 4, as viewed from the side opposite to the Z-direction.

Of the extension parts 53 to 56, the extension parts 53, 54 are situated at the ends on the Y-direction side of the center part 52 and extend from the center part 52 in the X-direction and the direction opposite to the X-direction, respectively, that is, in the directions away from each other. Meanwhile, the extension parts 55, 56 are situated at the ends on the side opposite to the Y-direction of the center part 52, and similarly to the extension parts 53, 54, extend from the center part 52 in the X-direction and the direction opposite to the X-direction, respectively, that is, in the directions away from each other.

As shown in FIG. 3, the positions of the distal ends of the extension parts 53 to 56 substantially coincide with both ends in the X-direction of the controller main body 4, as viewed from the side opposite to the Z-direction. The extension parts 53 to 56 are spaced apart from the curved surface 41B2 forming the rear surface 41B of the controller main body 4. That is, a space S1 is formed between the curved surface 41B2 and the extension parts 53 to 56, as shown in FIGS. 4 and 5.

Figure 9:
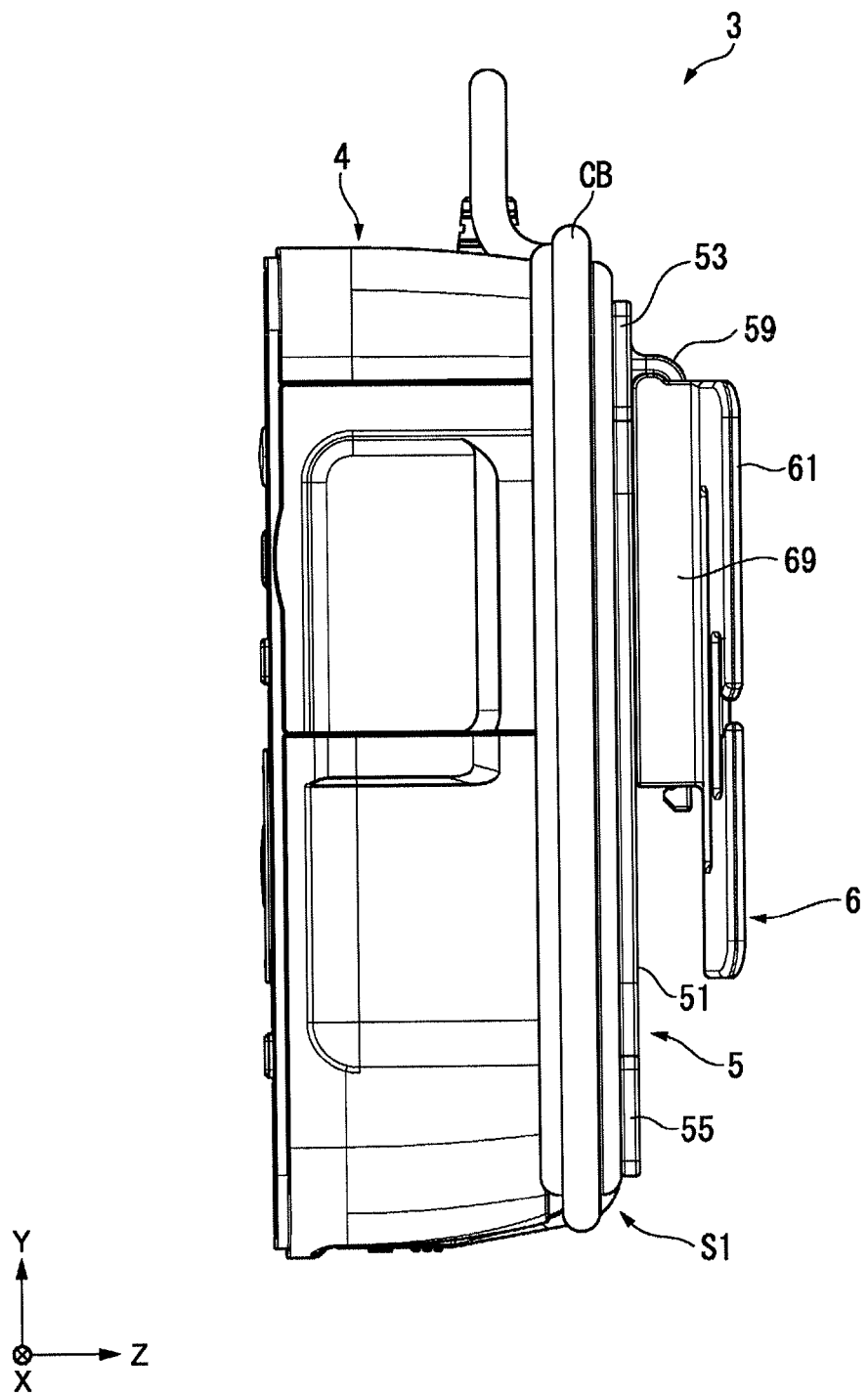
FIG. 9 shows the controller with a cable wound thereon in the embodiment.

FIG. 9 is a side view showing the controller 3 in the state where the cable CB is wound in the space S1 formed between the extension parts 53 to 56 and the curved surface 41B2.

As the cable CB is thus wound in the space S1, the cable CB can be housed, as shown in FIG. 9. That is, the movement of the cable CB in the Z-direction can be regulated by the extension parts 53 to 56. Therefore, obstruction by the cable CB in the use of the image display system 1 can be restrained.

The center part 52 with the extension parts 53 to formed thereon includes a smaller dimension in the X-direction than the controller main body 4. Therefore, the center part 52 and hence the controller main body 4 with the first attachment member 5 attached thereto can be made easier to hold in the hand, than in the case where the extension parts 53 to 56 are not formed and therefore the dimension in the X-direction of the center part 52 is the same as the dimension in the X-direction of the controller main body 4.

Back to FIG. 7, the hook 59 is formed on the surface on the Z-direction side of the main body part 51. To describe its details, the hook 59 includes a proximal end part 591 which protrudes in the Z-direction from an end part on the Y-direction side of the main body part 51 and then bends on the side opposite to the Y-direction, an extension part 592 extending from the proximal end part 591 toward the side opposite to the Y-direction, and a distal end part 593 which is an end part on the extending direction side of the extension part 592.

Of these, the dimension in the X-direction (direction of width) of the proximal end part 591 and the extension part 592 is substantially equal to the inner diameter dimension in the X-direction of the insertion hole 62 in the second attachment member 6, described below.

The distal end part 593 is formed with a smaller dimension in the X-direction than the proximal end part 591 and the extension part 592. The distal end part 593 includes a hook-like fastening part 594 which engages with the second attachment member 6 and fastens the first attachment member 5 to the second attachment member 6 when the hook 59 is inserted in the insertion hole 62.

Configuration of Second Attachment Member

Figure 10:
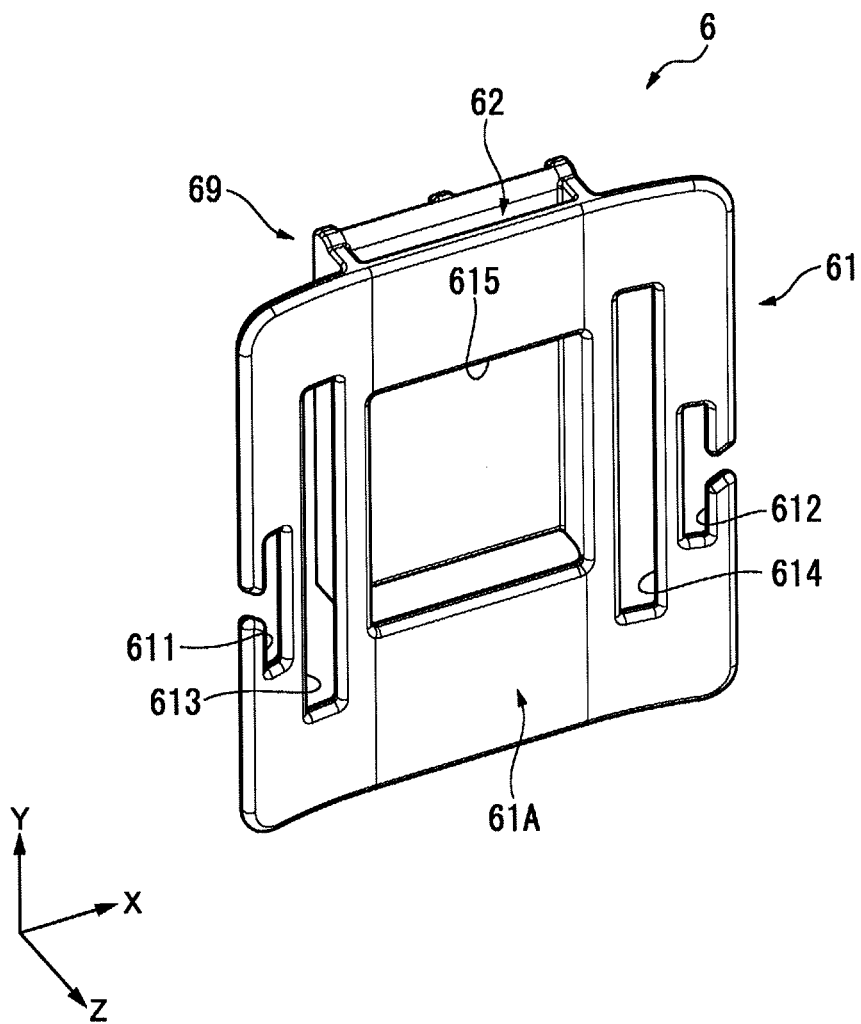
FIG. 10 shows a second attachment member in the embodiment.
Figure 11:
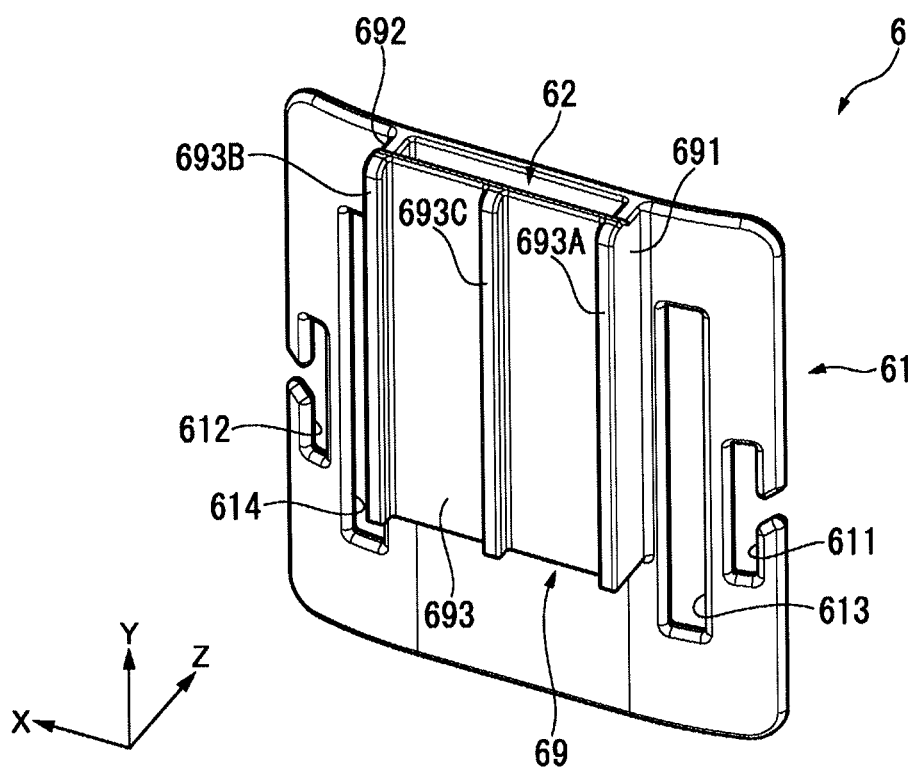
FIG. 11 shows the second attachment member in the embodiment, as viewed from the opposite side of FIG. 10.

FIG. 10 is a perspective view showing the second attachment member 6, as viewed from the side opposite to the Z-direction. FIG. 11 is a perspective view showing the second attachment member 6, as viewed from the Z-direction side.

The second attachment member 6 is for mounting the controller 3 on the mounting site, by being attached to the mounting site of the controller 3 and allowing the first attachment member 5 attached to the controller main body 4 to be attached to the second attachment member 6, as described above. The second attachment member 6 is a monolithically molded member formed in the shape of a plate, and includes a main body part 61 which contacts the mounting site, and a cover part 69 which houses the hook 59 when the hook 59 of the first attachment member 5 is inserted therein.

The main body part 61 includes an attachment surface 61A, a pair of passage holes 611, 612, a pair of passage holes 613, 614, and a hole 615.

Of these, the hole 615 is formed in a rectangular shape substantially at the center of the main body part 61.

The attachment surface 61A contacts the mounting site when attached to the mounting site. The attachment surface 61A is curved along the mounting site. Specifically, the attachment surface 61A is curved to be situated in the Z-direction as it goes in the X-direction and the direction opposite to the X-direction, from the center in the X-direction of the attachment surface 61A as the center of the curve. That is, the attachment surface 61A forms the curved surface according to the invention.

The pair of passage holes 611, 612 is a site through which the mounting band attached to the user is inserted and passed. Of the pair of passage holes 611, 612, the passage hole 611 is formed at an end part on the side opposite to the X-direction and the passage hole 612 is formed at an end part on the X-direction side. These passage holes 611, 612 are elongated in the Y-direction to match the cross-sectional shape of the mounting band.

The pair of passage holes 613, 614, too, is a site through which the mounting band attached to the user is inserted and passed. Of these passage holes 613, 614, the passage hole 613 is formed at an end part on the side opposite to the X-direction of the main body part 61 and the passage hole 614 is formed at an end part on the X-direction side. These passage holes 613, 614, too, are elongated in the Y-direction, similarly to the passage holes 611, 612. The passage hole 613, 614 are formed on the inner side of the passage holes 611, 612 and formed with a larger dimension in the Y-direction than the passage holes 611, 612.

To mount the second attachment member 6 having the main body part 61 as described above on the mounting band provided at the mounting site, the mounting band is inserted and passed through either the pair of passage holes 611, 612 or the pair of passage holes 613, 614. In this case, for example, the forward end of the mounting band is inserted and passed through one of the passage holes 611 to 614 and subsequently inserted and passed through the corresponding passage hole on the opposite side. Thus, the second attachment member 6 is attached to the mounting band.

The passage holes 611, 612 are open on the outer sides. The mounting band can also be inserted and passed through the passage holes 611, 612 via these open parts.

Thus, since the passage holes with different dimensions are formed in the main body part 61, a passage hole can be selected according to the width of the mounting band, and the mounting band can be inserted and passed through the selected passage hole. Thus, the second attachment member 6 can be attached in the state where there is little play with respect to mounting bands with different widths.

The cover part 69 includes a pair of side wall parts 691, 692 protruding substantially from the center of the main body part 61 toward the side opposite to the Z-direction, and a plate-like flat part 693 formed at the distal ends of the side wall parts 691, 692.

The side wall parts 691, 692 are situated on both sides of the hole 615 in the X-direction and formed along the Y-direction. The flat part 693 covers the space between the side wall part 691 and the side wall part 692, as viewed from the Z-direction side.

Here, the space surrounded by the main body part 61, the pair of side wall parts 691, 692 and the flat part 693 form the insertion hole 62 in which the hook 59 of the first attachment member 5 is inserted. The insertion hole 62 includes an opening on the Y-direction side and on the side opposite to the Y-direction. The inner diameter dimension in the X-direction of the insertion hole 62 is substantially the same as the dimension in the X-direction of the proximal end part 591 and the extension part 592 of the hook 59 of the first attachment member 5.

The flat part 693 includes protruding parts 693A, 693B which protrude from two ends in the X-direction of the flat part 693 toward the side opposite to the Z-direction and which are formed along the two ends, and a protruding part 693C which protrudes substantially from the center in the X-direction of the flat part 693 toward the side opposite to the Z-direction and which is formed along the two ends of the flat part 693.

As the first attachment member 5 is arranged on the side opposite to the Z-direction, as shown in FIG. 6, on the second attachment member 6 configured as described above, and the hook 59 of the first attachment member 5 is inserted in the direction opposite to the Y-direction from the opening on the Y-direction side of the insertion hole 62, the first attachment member 5 is attached to the second attachment member 6. In this case, the fastening part 594 of the hook 59 protrudes from the opening on the side opposite to the Y-direction of the insertion hole 62 and engages with the peripheral edge on the side opposite to the Y-direction of the flat part 693, as shown in FIGS. 2 to 4.

The distal ends of the protruding parts 693A to 693C formed on the flat part 693 contact the surface on the Z-direction side of the main body part 51 of the first attachment member 5, as shown in FIGS. 4 and 5.

As shown in FIGS. 3 and 5, the two ends in the X-direction of the main body part 61 are situated on the outer side of the two ends in the X-direction of the controller main body 4 and the distal end parts of the extension parts 53 to 56 of the second attachment member 6, as viewed from the side opposite to the Z-direction. The main body part 61 is spaced apart from the surface on the Z-direction side of the main body part 51 of the first attachment member 5. That is, a space S2 is formed between the surface on the Z-direction side of the main body part 51 and the main body part 61, as shown in FIGS. 4 and 5.

Figure 12:
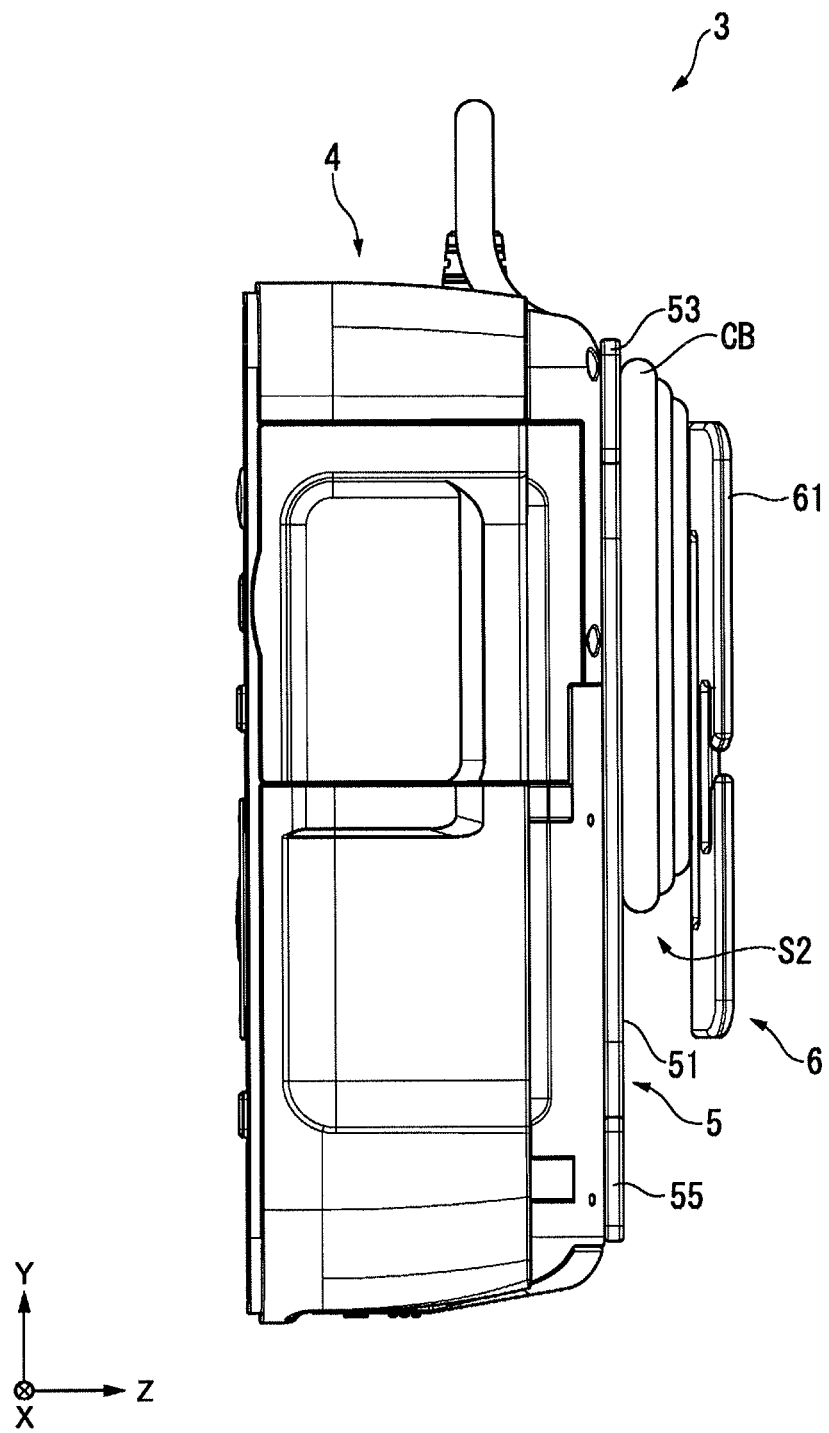
FIG. 12 shows the controller with a cable wound thereon in the embodiment.

FIG. 12 is a side view showing the controller 3 in the state where the cable CB is wound in the space S2 formed between the main body part 51 and the main body part 61.

As the cable CB is wound in the space S2 thus configured, the cable CB can be housed, as shown in FIG. 12. Therefore, obstruction by the cable CB in the use of the image display system 1 can be restrained.

That is, the cable CB is held between the main body part 51 and the main body part 61 and regulated in the movement in the Z-direction. That is, the main body part 61 forms the second attachment member-side regulating part according to the invention.

Examples of Mounting

Figure 13:
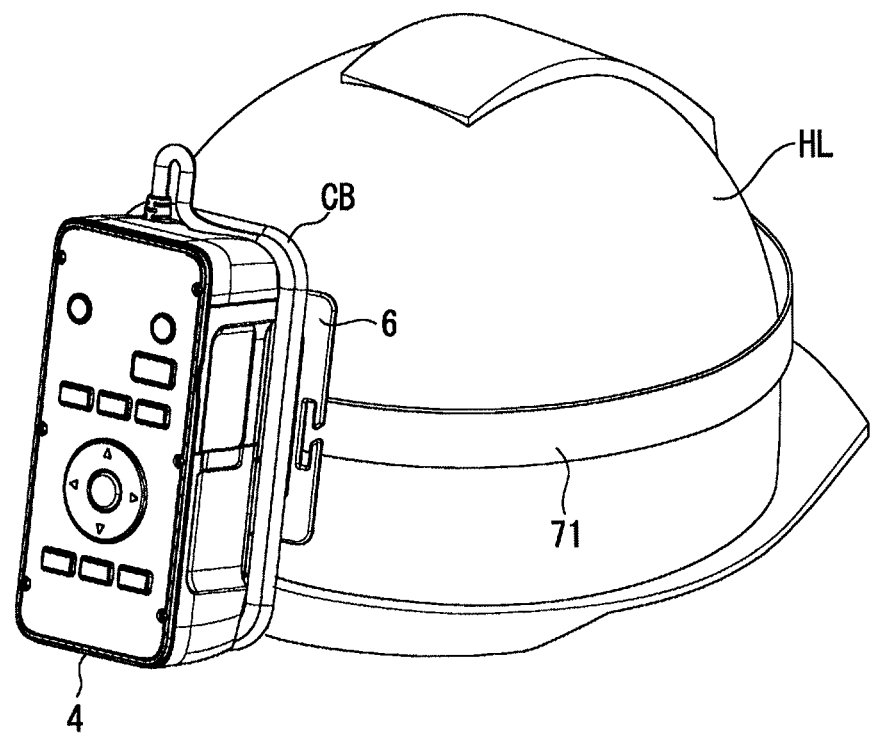
FIG. 13 shows an example of the mounting of the controller in the embodiment.
Figure 14:
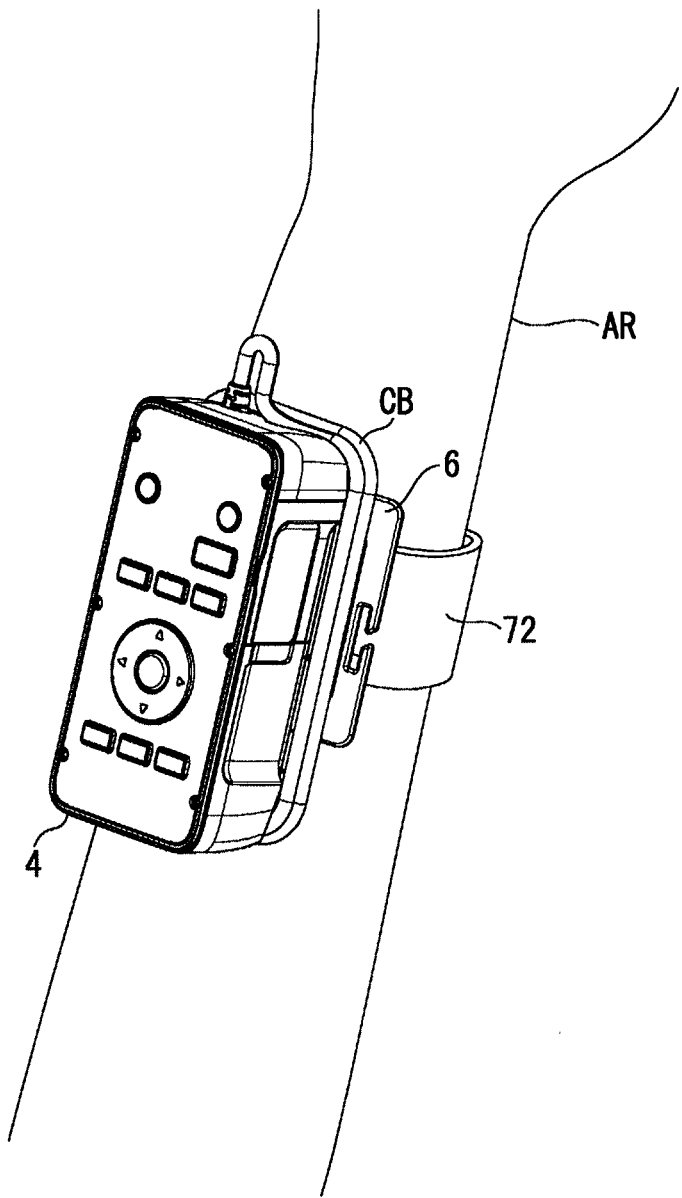
FIG. 14 shows another example of the mounting of the controller in the embodiment.
Figure 15:
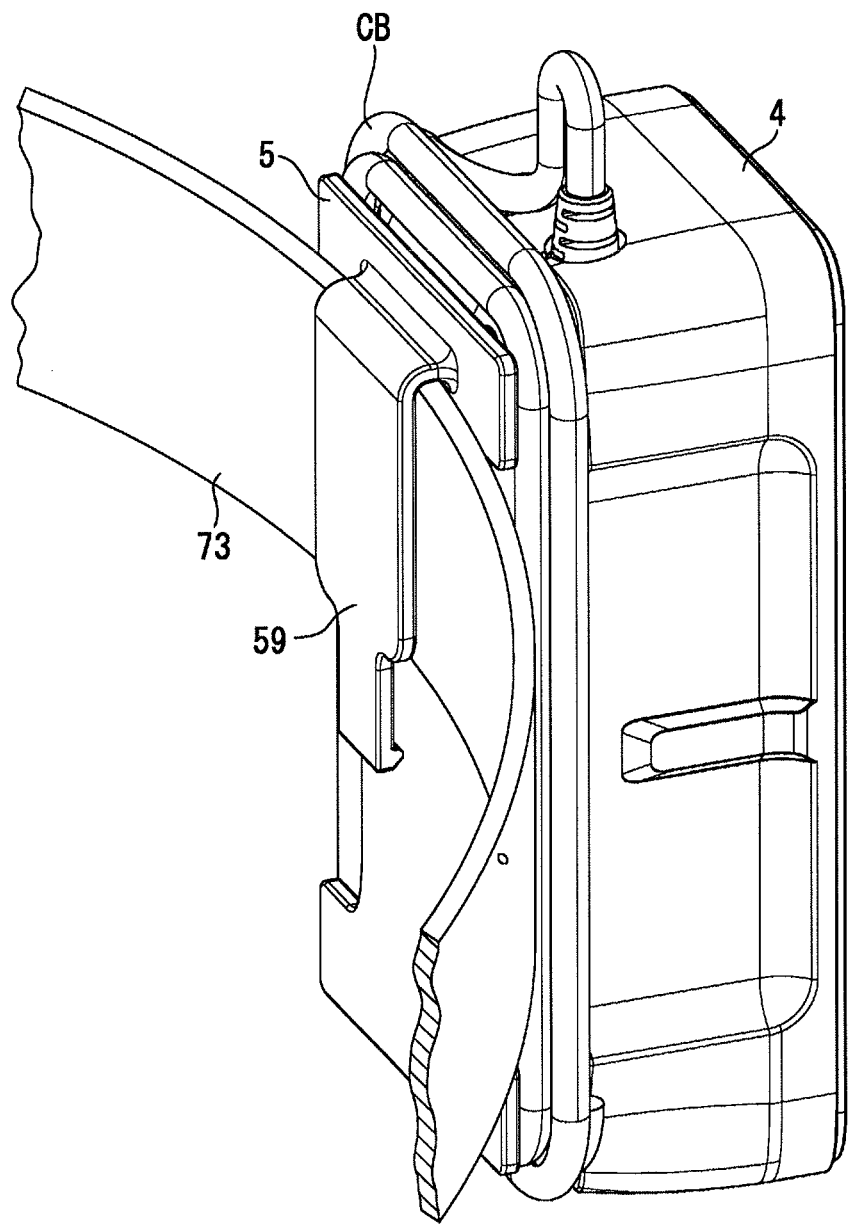
FIG. 15 shows another example of the mounting of the controller in the embodiment.

FIGS. 13 to 15 are schematic views showing examples of the mounting of the controller 3.

There are cases where the controller 3 is mounted using the second attachment member 6 and cases where the controller 3 is mounted without using the second attachment member 6, depending on the shape and state of the mounting site of the controller 3.

For example, if the mounting site of the controller 3 is a helmet HL and a band 71 as a mounting band is wound around the helmet HL, the band 71 is inserted and passed through the passage holes 613, 614 in the second attachment member 6, thus attaching the second attachment member 6 to the helmet HL, as shown in FIG. 13. Then, the first attachment member 5 attached to the controller main body 4 is mounted on the second attachment member 6, the controller 3, thus mounting the controller 3 on the helmet HL.

Also, if the mounting site of the controller 3 is the user's arm AR and a band 72 as a mounting band is wound around the arm AR, the second attachment member 6 is attached to the arm AR by inserting and passing the band 72 through the passage holes 613, 614 in the second attachment member 6, as shown in FIG. 14. Thus, the controller 3 is mounted on the arm AR, similarly to the above case.

Meanwhile, if the mounting site of the controller 3 is the user's waist and a belt 73 as a mounting band is wound around the waist, the hook 59 of the first attachment member 5 is hung on belt 73, thus attaching the first attachment member 5 with the controller main body 4 attached thereto, directly to the belt 73 without using the second attachment member 6, as shown in FIG. 15. Thus, the controller 3 is mounted on the waist.

Effects of Embodiment

The image display system 1 according to the embodiment described above has the following effects.

By attaching the first attachment member 5 attached to the controller main body 4, to the second attachment member 6 attached to the mounting site, it is possible to mount the controller 3 easily on the mounting site. Therefore, the wearability of the controller 3 can be improved.

Since the simple operation of inserting the hook 59 of the first attachment member 5 into the insertion hole 62 in the second attachment member 6 enables the first attachment member 5 to be attached to the second attachment member 6, the controller 3 can be easily mounted on the mounting site. Also, by hanging the hook 59 on the mounting band, it is possible to mount the controller main body 4 attached to the first attachment member 5 onto the mounting site without using the second attachment member 6.

Since the dimension in the X-direction of the hook 59 and the inner diameter dimension in the X-direction of the insertion hole 62 are substantially the same, the movement in the X-direction of the hook 59 inserted in the insertion hole 62 is regulated and therefore the unsteadiness of the first attachment member 5 attached to the second attachment member 6 can be restrained. Thus, the wearability of the controller 3 can be improved further.

Since the coming off of the hook 59 from the insertion hole 62 can be regulated by the fastening of the first attachment member 5 to the second attachment member 6 via the fastening part 594 of the hook 59 inserted in the insertion hole 62, the first attachment member 5 can be attached securely to the second attachment member 6 and the wearability of the controller 3 can be improved further.

The second attachment member 6 can be mounted on the mounting site by allowing the mounting band attached to the mounting site to be inserted and passed through the passage holes 611 to 614. Also, if the mounting band is provided at a mounting site such as a helmet or the user's arm or waist, the controller main body 4 can be mounted via the second attachment member 6 and the first attachment member 5. Therefore, the controller 3 can be mounted securely and easily at the mounting site desired by the user.

Since the cable CB can be housed by being wound in the space S1 between the controller main body 4 and the extension parts 53 to 56 of the first attachment member 5, obstruction by the cable CB in the use of the image display system 1 can be restrained. Also, the length of the cable CB can be adjusted.

The center part 52 of the first attachment member 5 is smaller in the dimension in the X-direction than the controller main body 4. Therefore, the center part 52 and hence the controller main body 4 with the first attachment member 5 attached thereto can be made easier to hold in the hand, than in the case where the extension parts 53 to 56 are not formed and therefore the dimension in the X-direction of the center part 52 is the same as the dimension in the X-direction of the controller main body 4.

Since the cable CB can be housed by being wound in the space S2 between the first attachment member 5 and the main body part 61 of the second attachment member 6, obstruction by the cable CB in the use of the image display system 1 can be retrained. Also, the length of the cable CB can be adjusted.

As the attachment surface 61A, which is a curved surface of the second attachment member 6, is arranged facing the mounting site, the second attachment member 6 can be attached in a stable state to the mounting site and the wearability of the controller 3 can be improved further.

Modifications of Embodiment

The invention is not limited to the above embodiment and includes modifications, improvements and the like within a range that can achieve the object of the invention.

In the embodiment, since the first attachment member 5 includes the hook 59 and the second attachment member 6 includes the insertion hole 62 in which the hook 59 is inserted, the first attachment member 5 is removably attached to the second attachment member 6. However, the invention is not limited to this configuration. For example, the first attachment member 5 may also be attached removably to the second attachment member 6 with a magnet or the like. Also, the measure for mounting the second attachment member 6 on the mounting site is not limited to the passage holes 611 to 614 through which the mounting band is inserted and passed, and other configurations may also be employed.

In the embodiment, the dimension in the direction of width of the hook 59 and the inner diameter dimension in the direction of width of the insertion hole 62 are substantially the same. However, the invention is not limited to this configuration. That is, the dimension in the direction of width of the hook 59 may be smaller than the inner diameter dimension in the direction of width of the insertion hole 62. For example, it is possible to restrain the unsteadiness of the first attachment member 5 attached to the second attachment member 6, by making the dimension in the direction of thickness (Z-direction) of the hook 59 and the inner diameter dimension in the direction of thickness of the insertion hole 62 substantially the same, or the like.

In the embodiment, the fastening part 594 is formed on the hook 59. However, the invention is not limited to this configuration. That is, the fastening part 594 may not be formed on the hook 59. For example, the second attachment member 6 may have a fastening part for fastening the hook 59.

In the embodiment, the controller main body 4 and the virtual image display device 2 are connected to each other via the cable CB. However, the invention is not limited to this configuration. That is, the controller main body 4 and the virtual image display device 2 may be wirelessly connected to each other.

In the embodiment, the space S1 is formed between the controller main body 4 and the extension parts 53 to 56 of the first attachment member 5. However, the invention is not limited to this configuration. That is, the space S1 may not be formed. Also, while the space S2 is formed between the first attachment member 5 and the main body part 61 of the second attachment member 6 in the embodiment, the invention is not limited to this configuration. That is, the space S2 may not be formed.

In the embodiment, the extension parts 53 to 56 of the first attachment member 5 extend in the X-direction and the direction opposite to the X-direction, from both ends in the Y-direction of the center part 52. However, the invention is not limited to this configuration. For example, the extension parts 53 to 56 may extend outward, substantially from the center in the Y-direction of the center part 52. The directions of extension of the extension parts 53 to 56 may be different from the X-direction and the direction opposite to the X-direction. Also, the number of extension parts may be four or more. Alternatively, the extension parts may not be formed.

In the embodiment, the second attachment member 6 includes the curved surface along the mounting site. However, the invention is not limited to this configuration. That is, the second attachment member 6 may not have a curved surface. For example, if the mounting site is flat, the second attachment member 6 need not have a curved surface.

In the embodiment, the controller main body 4 and the first attachment member 5 are formed as separate units. However, the invention is not limited to this configuration. That is, the controller main body 4 and the first attachment member 5 may be formed as a single unit. For example, the controller main body 4 may have a configuration equivalent to the extension parts 53 to 56 and the hook 59. In this case, the extension parts 53 to 56 and the hook 59 may be provided on the rear surface 41B (surface facing the first attachment member 5) of the controller main body 4 or may be provided on another surface. Also, the extension parts 53 to 56 and the hook 59 may be provided on different surfaces from each other.

In the embodiment, in the case where the controller 3 mounted on the mounting site without using the second attachment member 6, the hook 59 of the first attachment member 5 is hung on the belt 73 wound around the user's waist. However, the invention is not limited to this example. That is, any mounting site can be used and no mounting band may be needed, as long as it is possible to hang the hook 59 and to mount the controller 3. For example, the hook 59 may be hung on a pocket of the clothes or the waist part of the bottoms worn by the user.

In the embodiment, the cable CB can be wound around the controller 3. However, a cable fixture part for fixing the cable CB may be provided on at least one of the controller main body 4, the first attachment member 5 and the second attachment member 6. The cable fixture part may be, for example, a cut-out in which the cable CB can be inserted, a hook on which the cable CB can be hung, or the like. The position of such a cable fixture part can be, for example, an outer peripheral part of the controller main body 4, the first attachment member 5 and the second attachment member 6. Thus, if the end of the cable CB wound in the space S1 or the space S2 is fixed by the cable fixture part, the loosening of the cable CB can be regulated.

In the embodiment, the controller main body 4 transmits an operation signal corresponding to an input operation on the operation buttons 411, to the virtual image display device 2. The invention is not limited to this configuration. For example, if the controller main body 4 includes an audio recognition unit instead of or in addition to the operation buttons 411, the controller main body 4 may transmit an operation signal corresponding to a recognized sound, to the virtual image display device 2. Also, the controller main body 4 may be configured with an acceleration sensor or angular velocity sensor. In this case, if an operation such as shaking the controller main body 4 is carried out, a movement of the controller main body 4 may be detected and an operation signal corresponding to the movement may be transmitted. Moreover, for example, if the virtual image display device 2 or the controller main body 4 includes a camera, a movement (gesture) of a detection target such as the user's hand may be detected on the basis of an image picked up by the camera, and an operation signal corresponding to the movement may be transmitted.

In the embodiment, the virtual image display device 2 as an image display device includes the head band part 21, the display part 22 and the arm part 23. However, the invention is not limited to this configuration. For example, the virtual image display device may be configured to be suspended over the user's ears and nose by a frame and temples which support a display part arranged at a position corresponding to the user's eyes. Also, the display part 22 is not limited to the configuration arranged to cover both eyes of the user and may be configured to be arranged at a position corresponding to one eye.

In the embodiment, the virtual image display device 2 displaying an image which is visually recognized as a virtual image by the user is described as an example of the image display device. However, the invention is not limited to this example. For example, a configuration in which a display unit such as a liquid crystal panel or organic EL (electroluminescence) panel is provided at a position corresponding to both eyes of the user may be employed.

It is also possible to use a laser retinal projection-type HMD, as the image display device. For example, an HMD may be employed in which a display part includes a laser light source and an optical system that guides light from the laser light source to the user's eyes, and in which the laser beam becomes incident on the user's eyes, scans the retinas and forms an image on the retinas, thus causing the user to visually recognize the image.

In the embodiment, the controller 3 outputs an operation signal to the image display device such as the virtual image display device 2. However, the invention is not limited to this configuration. That is, the invention may be applied to a controller which outputs an operation signal to other devices worn and used by the user.

The entire disclosure of Japanese Patent Application No. 2014-236703, filed Nov. 21, 2014 is expressly incorporated by reference herein.

What is claimed is:

1. An image display system comprising:
    an image display device mounted at a position corresponding to a user's head; and
    a controller for outputting an operation signal to the image display device, the controller comprising:
    a controller main body which outputs the operation signal;
    a first attachment member attached to the controller main body; and
    a second attachment member which is attached to a mounting site where the controller is mounted, and to which the first attachment member is removably attached,
    wherein the first attachment member includes a center part, whereby extension parts extend from both ends in a vertical direction of the center part, the center part including protruding parts for positioning, the protruding parts protruding on a side opposite a Z-direction of the attachment member, and situated next to each other in an X-direction of the image display system, wherein the center part with the extension parts includes a smaller dimension in the X-direction than a dimension of the controller main body in the X-direction of the controller main body.

2. The image display system according to claim 1, wherein
    the first attachment member includes a hook, and
    the second attachment member includes an insertion hole in which the hook is inserted.

3. The image display system according to claim 2, wherein
    a dimension in the X-direction of the hook and an inner diameter dimension in the X-direction of the insertion hole are substantially the same.

4. The image display system according to claim 2, wherein
    the hook includes a hook-like fastening part which fastens the first attachment member to the second attachment member when inserted in the insertion hole.

5. The image display system according to claim 1, wherein
    the second attachment member includes a passage hole through which a mounting band attached to the mounting site is inserted and passed.

6. The image display system according to claim 1, further comprising a cable extending from the controller main body,
    wherein the first attachment member includes:
    an attachment part attached to the controller main body; and
    a first attachment member-side regulating part which extends outward from the attachment part when viewed along a counter direction facing the controller main body and which regulates a movement of the cable situated outside the controller main body.

7. The image display system according to claim 1, further comprising a cable extending from the controller main body,
    wherein the second attachment member forms a space where the cable can be arranged, between the second attachment member and the first attachment member, and the second attachment member includes a second attachment member-side regulating part which regulates a movement of the cable arranged in the space.

8. The image display system according to claim 1, wherein
    the second attachment member includes a curved surface along the mounting site, on a side opposite to a side facing the first attachment member.

* * * * *